April 8, 1930.  E. E. EINFELDT  1,753,237
WHEEL STRUCTURE
Filed Dec. 29, 1927
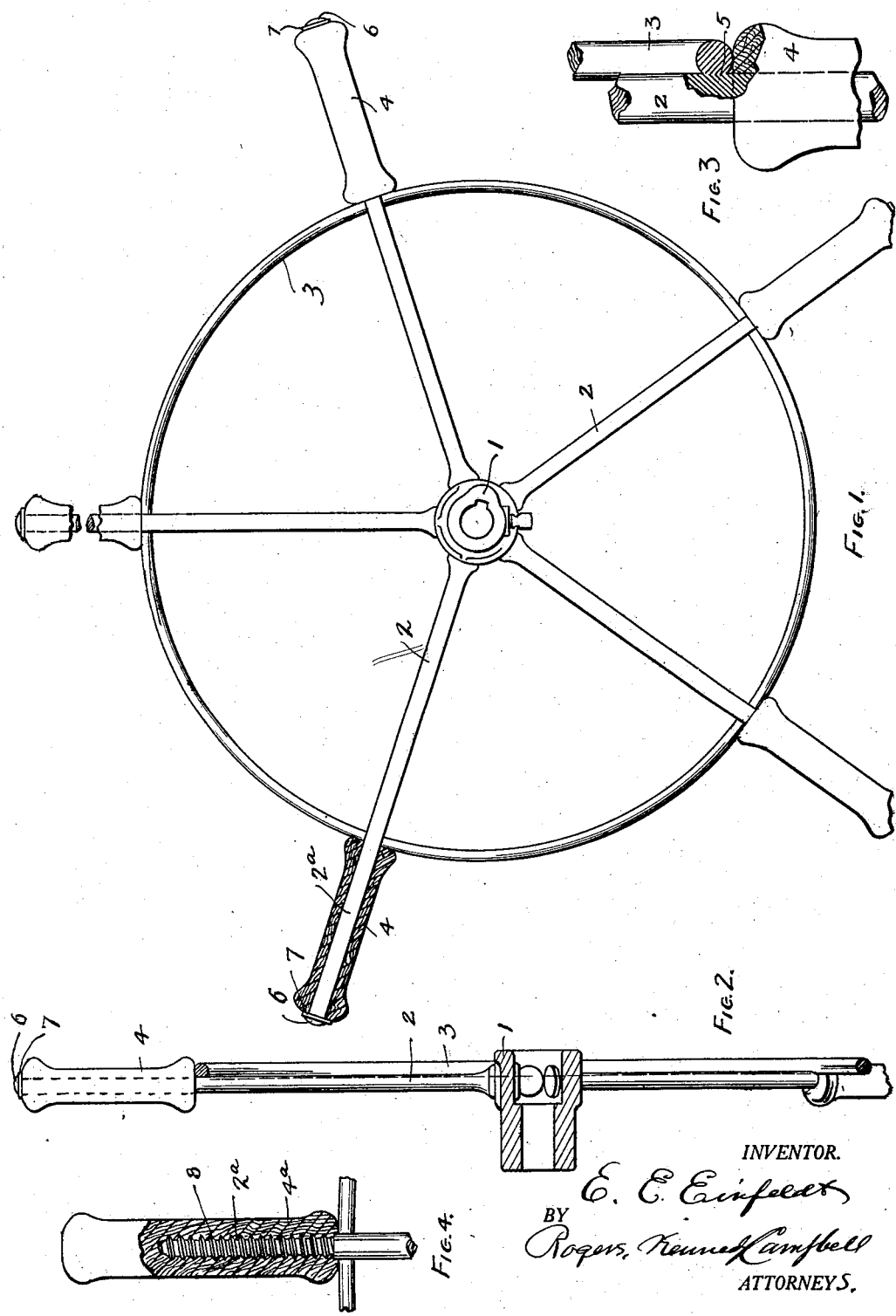
INVENTOR.
E. E. Einfeldt
BY
Rogers, Kennedy Campbell
ATTORNEYS.

Patented Apr. 8, 1930

1,753,237

UNITED STATES PATENT OFFICE

ERNEST E. EINFELDT, OF DAVENPORT, IOWA, ASSIGNOR TO FRENCH & HECHT, INCORPORATED, A CORPORATION OF IOWA

WHEEL STRUCTURE

Application filed December 29, 1927. Serial No. 243,281.

This invention relates to wheel structures and particularly to so called hand wheels, employed among other purposes for adjusting movable parts, hand wheels for such purpose comprising a hub to be operatively connected with the part to be moved, spokes radiating from the hub, and a rim member connected with the spokes, the wheel being turned either by grasping the rim member, or the spokes may be extended beyond the rim member and handles applied thereto for turning the wheel.

It is the aim of the present invention to provide a structure of this type which will be of simple and durable form, and which may be produced at a minimum of expense, and with these and other objects in view the invention consists of the improved form and arrangement of parts described in detail in the specification to follow, and the novel features of which will be set forth in the appended claims.

In the accompanying drawings

Fig. 1 is a side elevation of a hand wheel structure having my invention embodied therein.

Fig. 2 is a sectional elevation of the same, the section being taken axially of the wheel.

Fig. 3 is a fragmentary sectional elevation, on an enlarged scale, showing how the rim is connected with the spokes.

Fig. 4 is a fragmentary sectional elevation showing a different method of attaching the handles to the spokes.

Referring to the drawings;

In Figs. 1, 2, 3, 1 designates a hub, 2 spokes connected to and radiating therefrom, 3 a rim member attached to the spokes near their outer ends, whereby the outer end portions 2ª of the spokes will project beyond the rim, and 4 designates handles applied to the projecting ends of the spokes.

My invention is concerned mainly with the attachment of the rim rigidly and integrally to the spokes, and in accordance with the invention this is effected by seating the rim against the sides of the spokes and integrally connecting together the contacting portions of the two as best shown in Fig. 3.

I prefer to effect such integral connection of the parts by a welding operation, preferably spot welding, the effect of which will cause the metal of the rim and spokes to flow into each other as shown at 5 in Fig. 3; or instead of spot welding, the parts may be welded together by other means or methods.

By this method of attaching the rim to the spokes, a firm and solid union of the parts will be effected without the necessity of forming holes in the rim to receive the spokes and forming shoulders on the spokes to bear against the outer and inner sides of the rim as heretofore practiced; whereby, a saving of time, labor, material and expense is effected, and a solid, integral, unitary structure is produced.

The spokes are of a length to project to a considerable extent outwardly beyond the rim, to receive the handles 4, which in the form of the invention shown in Figs. 1, 2, 3, are provided with holes extending longitudinally therethrough to receive the projecting ends of the spokes, and the handles are held in place on the spokes with their inner ends seated against and receiving a bearing from the outer side of the rim, by means of rivets or heads 6 on the outer ends of the spokes bearing against washers 7 which in turn bear against the outer ends of the handles.

The wheel thus produced is of simple and durable construction and is in the form of a single unitary integral structure, and therefore may be manufactured at a little expense, and being so formed there will be little or no liability of the parts becoming loose or being displaced.

In Fig. 4 the handles 4ª are shown as fastened to the projecting portions 2ª of the spokes by forming screw threads 8 on the latter and screwing the handles thereon.

In the foregoing description and accompanying drawings I have set forth my invention in the specific form and arrangement of parts which I prefer to adopt, but it will be understood that these details may be variously changed and modified by the skilled mechanic without departing from the limits of the invention; and it will be further understood that the invention is not limited to any particular form or construction of the parts except in so far as such limitations are specified in the claims.

Having thus described my invention, what I claim and desire to secure by Letters Patent is:—

1. In a wheel structure, the combination of a hub, spokes connected thereto, a rim having unbroken surface portions seated against and connected integrally with the sides of the spokes inward of their outer ends and leaving portions of the spokes projecting beyond the rim, and handles applied to the projecting portions of the spokes.

2. In a wheel structure, the combination of a hub, spokes connected thereto, a rim seated against and connected integrally with the sides of the spokes inward of their outer ends and leaving portions of the spokes projecting beyond the rim, handles surrounding the projecting portions of the spokes and seated against the rim, and heads on the outer ends of the spokes bearing against the outer ends of the handles and confining them on the spokes and in positive engagement with the rim.

3. In a wheel structure, the combination of a hub, a series of spokes connected thereto, and a rim seated laterally against said spokes at points intermediate their ends, said spokes and rim being circular in cross section at their points of contact and welded together at such points.

4. In a wheel structure, the combination of a hub, a series of spokes connected thereto, a rim seated against and having lateral contact only with the said spokes at points intermediate their ends, said spokes and rim being welded together at such points of contact.

5. In a wheel structure, the combination of a hub, a series of spokes connected thereto, a rim seated against and having lateral contact only with the said spokes at points intermediate their ends, said spokes and rim being welded together at such points of contact, and handles arranged on the protruding ends of the spokes.

In testimony whereof, I have affixed my signature hereto.

ERNEST E. EINFELDT.